United States Patent [19]

Gupta et al.

[11] Patent Number: 4,526,649
[45] Date of Patent: Jul. 2, 1985

[54] METHOD OF MOLDING BONDED PARTS WITH SILICON CARBIDE SURFACES

[75] Inventors: Ashok K. Gupta; Ernö Gyarmati, both of Jülich; Rudolf Münzer, Herzogenrath; Aristides Naoumidis, Jülich, all of Fed. Rep. of Germany

[73] Assignee: Kernforschungsanlage Jülich GmbH, Jülich, Fed. Rep. of Germany

[21] Appl. No.: 594,571

[22] Filed: Mar. 29, 1984

[30] Foreign Application Priority Data

Mar. 30, 1983 [DE] Fed. Rep. of Germany ....... 3311553

[51] Int. Cl.$^3$ .................. B44C 1/22; C03C 15/00; C03C 25/06; C03B 29/00
[52] U.S. Cl. ..................... 156/629; 156/89; 156/272.8; 156/643; 156/657; 252/79.2; 252/79.3; 252/79.5; 264/56
[58] Field of Search .................. 252/79.2, 79.3, 79.5; 156/89, 155, 629, 643, 272.8, 657; 264/29.5, 113, 56

[56] References Cited

U.S. PATENT DOCUMENTS

| | | | |
|---|---|---|---|
| 2,319,323 | 5/1943 | Heyroth | 201/76 |
| 2,943,008 | 6/1960 | Saunders | 156/89 X |
| 3,857,744 | 12/1974 | Moss | 156/60 |
| 4,487,644 | 12/1984 | Gupta et al. | 156/89 |

FOREIGN PATENT DOCUMENTS 0076467  9/1982  European Pat. Off. .
1796279  5/1970  Fed. Rep. of Germany .

Primary Examiner—William A. Powell
Attorney, Agent, or Firm—Frishauf, Holtz, Goodman & Woodward

[57] ABSTRACT

For joining molded parts having silicon carbide surfaces, the surfaces are first roughened to a depth of about 100–500 μm by removal of the free silicon either by vaporization or by etching when treating silicon containing silicon carbide layers containing at least 15% weight of excessive silicon. In the alternative, when no excessive silicon is present, the roughening can be done by laser shots pitting the surface. The pores provided by such a step are then loaded with carbon by (repeated) application of a cokable resin followed by coking, said resin can be soaked into the pores or attached as silicon containing resin wafer of cokable material. The surfaces to be joined are united and are heated, preferably at from 1600° to 1800° C. in the presence of silicon that is either made available at the edges of the joint as a liquid or else has been provided in the joint by a synthetic resin foil in which silicon powder is dispersed.

23 Claims, No Drawings

METHOD OF MOLDING BONDED PARTS WITH SILICON CARBIDE SURFACES

This invention concerns a method for bonding together molded parts, composed of silicon carbide at least at and adjacent to the surfaces to be joined, by applying a cokable binder on those surfaces followed by coking the binder and heating of at least the joints in the presence of silicon.

Silicon carbide molded bodies of complicated shape are in practice made of several parts which have to be joined together.

Thus, in U.S. Pat. No. 2,319,323 a method is described according to which parts of carbon or silicon carbide or of a reaction-bonded silicon carbide (designated as "SiSiC", which is a material containing an excess of silicon) are joined together with an adhesive made of carbon and cokable binder and are then heated in the presence of silicon powder at temperatures above about 1800° C.

According to another method, described in German patent document DE-AS 17 96 279, molded bodies having a silicon carbide coating and a carbon core are made of carbon parts which are joined by a cement made of cokable binder, carbon, and silicon carbide and are heated briefly to the range of 1650° to 2200° C. in the presence of an excess of molten silicon.

In a pending U.S. Patent Application Ser. No. 423,458, filed Sept. 24, 1982 and now issued as U.S. Pat. No. 4,487,644 to the assignee of the present application, a method is described in which at least one of the joined surfaces of parts made of silicon carbide, or having a silicon carbide surface layer, is made to contain an excess of silicon in the form of SiSiC. The finely polished joint surfaces are joined together in that method without any adhesion and are heated, preferably under the application of a certain pressing force of at least 0.1 kg/cm² on the joined surfaces, up to 1500° to 1800° C. for 15 to 100 minutes, in an inert atmosphere at a pressure between $10^{-3}$ torr to 1 atmosphere.

Whereas in the methods working with an adhesive, difficulties occur relative to the shape fidelity of the products of the process, in the case of the methods working without adhesive, there is a degree of uncertainty regarding the joining together without defects of the surfaces to be welded together, and, in addition, in the processess working with an applied pressure, there is a complication by the need of pressure application.

SUMMARY OF THE INVENTION

The object of the present invention is to provide a process for joining silicon carbide molded parts which will operate as simply as possible and with few rejects.

Briefly, the surfaces to be joined are at first roughened either by removing the free silicon up to a depth of not less than 100 μm from the surface layer of reaction bonded silicon carbide containing at least 15% free silicon or else with laser shots producing pits distributed over the surfaces. Then the pores of the thus treated surfaces are impregnated with a cokable binder followed by coking of the binder, the steps of applying a binder and coking it being preferably repeated two to four times, after which the parts are put together and finally heated in the presence of silicon to convert said carbon in the pores to silicon carbide at temperatures between 1500° and 2000° C., the silicon being supplied either by bringing molten silicon to the edges of the joint, or by attaching a silicon releasing powder packing to the edges of the joint. Alternatively a thin wafer of synthetic resin containing silicon dispersed therein is interposed between the joined roughened surfaces which are finally heated. In the course of this heating said resin of the wafer is soaked into the pores wherein it is coked and finally converted into silicon carbide by reaction with the silicon component of the wafer.

This final heating step brings at least the joint to a temperature between 1500° and 2000° C., and preferably between 1600° and 1800° C., and converts the carbon in the joint zone to silicon carbide.

The separation of free silicon up to a depth of at least 100 μm can be achieved by evaporating or leaching the superfluous silicon out of the surface layer.

The process of the invention makes it unnecessary to utilize a vacuum system. Devices for pressing the parts together are not necessary either. A trouble-free bonding of the parts is obtained, as has been shown to be the case by microphotography of ground samples exposing the joint in cross section. In such microphotographs, the seam corresponding to the joint is no longer visible. The great advantage of the process of the invention, which can be carried out without vacuum systems or pressing devices, is that even at inaccessible locations and at the bottom of cavities it is possible to weld parts together directly in any site (in situ).

Reaction-bonded silicon carbide contains free silicon that fills the open pores of the material. In the process of the invention the free silicon is driven out of the surfaces to be joined, especially by means of an etching treatment, thus producing a "roughened" surface containing anchoring pits that are then loaded with finely divided carbon as the result of repeated treatment with cokable material followed by coking. For the cokable materials, there come into consideration, as a whole, the known resins, tars, pitches, and the like. The finely divided carbon reacts upon further heating quite rapidly with the silicon that infiltrates when it is applied to the joint after the surfaces to be joined are put together.

This process can be simplified by applying a synthetic resin foil of a thickness up to about 1 mm containing fine silicon powder (especially from 10 to 50 mg per cm², grain size not exceeding 1 μm, pretreated with hydrofluoric acid) either on or inbetween the joined surfaces. Upon heating the joint, the resin first passes through a thin liquid phase during which it infiltrates into the pores and then it is converted into carbon at higher temperatures. Upon further heating, up to at least 1600° C., the silicon located in the joint, and the carbon together produce silicon carbide. Preferably said foil or wafer has a thickness of 10 to 100 μm and contains 30 to 70 wt. % silicon powder. Most preferred are wafers of 20 to 50 μm containing about 50 wt. % silicon.

For removal of the free silicon from the SiSiC surface, a treatment with a solution of HF and $HNO_3$ or with potassium or sodium hydroxide, for example, is suitable. The acid or alkaline treatment lasts for several hours at temperatures between 20° and 80° C. The treatment temperature and the concentration of the solution are two variables which determine the removal of the free silicon. High temperatures and high concentrations provide for rapid de-siliconizing. At lower temperatures and concentrations, the process runs only slowly.

As a rule, after four to six hours of etching at temperatures in the range from 70° to 80° C., with a concentration of the acid or alkaline solution of about 40%, a desiliconized zone of from 400 to 600 μm in depth is obtained. It is important that no etching liquid should remain in the desiliconized zone after the etching. Hence, the silicon is preferably dissolved out with volatile acids which can be driven out by a final heat treatment (for example, 10 minutes at 200° to 300° C. in the case of a mixture of nitric and hydrofluoric acids). In cases in which desiliconizing with acid or alkali might be problematical, the silicon can be removed by evaporating it off. A simple high temperature furnace flushed with a protective gas is adequate for this purpose. Normally, resistance or induction furnaces with graphite heating elements or susceptors are used with argon as protective gas. In accordance with the invention, a three-hour heating at 2000° C. is sufficient to evaporate the free silicon of the sample in a quantitatively manner.

In the case of silicon carbide materials of small free silicon content, or of hot pressed silicon carbide, or work pieces which for technical reasons cannot be desiliconized in an etching solution, nor by an evaporation process, a laser ray roughening treatment is recommended. By means of a high energy laser gun operating in combination with an automatic microstep generator, up to $10^4$ craters or pits of a depth of about 500 μm and a diameter of 100 to 200 μm, can be produced in an hour. These microcraters then serve in the following steps as "anchoring pits" for the SiC bond to be produced.

There are several possibilities for the operation of loading the pores with carbon. One of the most commonly used processes is the soaking of the pores with a resin solution followed by evaporation of the solvent and coking of the resin residue. Impregnation with a liquid resin is also possible, or impregnation with the liquid monomer of a synthetic resin which thereafter is hardened in the pores by means of a catalyst or a gaseous reactant.

In order to assure a sufficient deposition of carbon within the pores, a suitably liquid cokable material or a liquid dilution of such material, as for example a resin solution, must be used. It is particularly preferred to provide repeated impregnation with cokable material or resin, followed by heating and coking of the resin quantities taken up in the pores.

The surfaces with surface zones loaded with carbon, of the silicon carbide bodies treated as above-described, may usefully be given a mechanical reworking in order to remove an outer coked layer, after which the parts to be joined are brought in close contact and are treated with liquid silicon at temperatures above 1500° C.

The invention will now be further explained with reference to an example.

EXAMPLE

Rods of square cross section composed of SiSiC were exposed at their ends for four hours to a 1:1 mixture of concentrated nitric acid and 40% hydrofluoric acid, at 80° C. The thoroughly washed rods were rinsed with alcohol for removal of water and finally dried by warming. Then they were dipped in a 20% solution of phenol/formaldehyde resin (PFH resin DF 1949 of Bakelite GmbH, Iserlohn) in ethylacetate. The rods were thereafter "dried" and subjected to a coking treatment at 800° C. This resin impregnation and coking was repeated twice.

The surface was then finely polished and the joined rods were clamped together, heated up to 1750° C. and liquid silicon was supplied to the joint by means of a graphite wick. After the setting in of the reaction, the parts to be joined were left for ten minutes at 1750° C. and then cooled down in the furnace.

A seamless joining of the connected rods was obtained, as already mentioned.

Although the invention has been described with reference to a specific example and several sequences of treatment steps, it will be recognized that additional variations and modifications are possible wthin the inventive concept.

For example, instead of liquid silicon brought to the joint packing containing silicon powder can be used to supply silicon to the joint for the high temperature conversion stage. Preferably a packing of mixed powders of silicon and silicon carbide in approximately equal proportions and of a grain size between 200 and 400 μm is used as the power-pack.

We claim:

1. Method of bonding together molded parts, composed of silicon carbide at least on and near their surfaces, at respective silicon carbide joining surfaces thereof, comprising
   roughening the surfaces to be joined up to a depth of at least 100 μm;
   loading the pores of the roughened zone by carbon coked in the pores and
   infiltrating liquid silicon into the joint converting the carbon to silicon carbide at a temperature between 1500° and 2000° C.

2. A method according to claim 1 in which the step of roughening is performed by removing free silicon from a surface zone of reaction bonded silicon carbide containing at least 15% free silicon.

3. Method according to claim 2 in which the step of removing free silicon is performed by vaporizing off the silicon by prolonged heat.

4. Method according to claim 2 in which the step of removing free silicon is performed by leaching the surface layer with a silicon dissolving liquid.

5. Method according to claim 4, in which the leaching is performed with a hydrofluoric acid solution containing an oxidizer, followed by expelling liquid residues by washing, drying and heating.

6. Method according to claim 4 in which the leaching is performed by the etching with a solution of sodium or potassium hydroxide.

7. Method according to claim 1 in which the roughening is performed up to a depth of between 200 to 600 μm.

8. Method according to claim 1 in which molded parts of silicon carbide are bonded containing about 20% free silicon in and near the surfaces to be joined.

9. Method according to claim 1 in which the step of roughening is performed by means of laser shots producing pits distributed over the surface to be joined.

10. Method according to claim 9 in which said pits have a depth of about 500 μm and a diameter of about 200 μm and a spacing between the pits of 200 to 500 μm.

11. Method according to claim 1 in which the step of pore loading is done by impregnating the pores with a cokable material of low viscosity and coking said material in the pores.

12. Method according to claim 11 in which said impregnating and coking is repeatedly performed.

13. Method according to claim 12 in which said impregnating and coking is between two and four fold performed.

14. Method according to claim 11 in which a low viscosity solution of phenolformaldehyde resin is used for said impregnating.

15. Method according to claim 11 in which a catalytically polymerisable resin on the base of at least one member of the group comprising furfural and furfuryl alcohol is used for said impregnating.

16. Method according to claim 1 in which said steps of loading the pores by coked carbon and infiltrating liquid silicon are performed by inserting a synthetic resin wafer containing silicon dispersed therein between said joining surfaces putting said respective joining surfaces together to form a joint having said wafer held therein and heating the thus prepared joint carefully up to 1500° to 2000° C.

17. Method according to claim 16 in which said synthetic resin wafer has a thickness of 10 to 100 $\mu$m and contains 30 to 70 wt. % silicon powder of at most 1 $\mu$m grain size.

18. Method according to claim 17 in which said wafer has a thickness of 20 to 50 $\mu$m and contains about 50 percent by weight silicon powder.

19. Method according to claim 17 in which said wafer is formed with phenolformaldehyde resin.

20. Method according to claim 1 in which said infiltration of silicon and conversion to silicon carbide is performed by attaching a packing of silicon releasing powder to the edges of the joint and heating said assembly to 1500° to 2000° C.

21. Method according to claim 20 in which said silicon releasing powder is formed by a 1:1 powder mixture of silicon and silicon carbide.

22. Method according to claim 21 in which said powder has a grain size in the range of 200 to 400 $\mu$m.

23. Method according to claim 1 in which said converting to silicon carbide is performed at 1600° to 1800° C.

* * * * *